US008756280B1

(12) United States Patent
Jordan et al.

(10) Patent No.: US 8,756,280 B1
(45) Date of Patent: Jun. 17, 2014

(54) SYSTEM, METHOD AND COMPUTER PROGRAM PRODUCT FOR OPTIMIZATION OF POST-REVIEW PROCESS

(75) Inventors: Leslie Jordan, Austin, TX (US); Algis Woss, Austin, TX (US); Austin Arnold, Austin, TX (US)

(73) Assignee: Socialware, Inc., Austin, TX (US)

( * ) Notice: Subject to any disclaimer, the term of this patent is extended or adjusted under 35 U.S.C. 154(b) by 179 days.

(21) Appl. No.: 13/299,913

(22) Filed: Nov. 18, 2011

(51) Int. Cl.
*G06F 15/16* (2006.01)

(52) U.S. Cl.
USPC ........... 709/204; 709/202; 709/203; 709/207; 709/223

(58) Field of Classification Search
USPC .......................... 709/204, 202, 203, 207, 223
See application file for complete search history.

*Primary Examiner* — Lan-Dai T Truong

(74) *Attorney, Agent, or Firm* — Sprinkle IP Law Group

(57) ABSTRACT

In highly regulated industries, all communications with social media may need to be archived and reviewed for compliance. Embodiments disclosed herein can optimize or otherwise significantly improve the post-review process. In one embodiment, a request submitted by a user to post to a social network is processed to ensure that the request is associated with pre-approved content. The response from the social network is processed to obtain a platform post identifier. In one embodiment, a lookup table is updated to reflect that the pre-approved content is associated with the platform post identifier. An associative table containing a set of communications with the social network may be processed to obtain platform post identifiers. Communications that have platform post identifiers associated with pre-approved content identifiers are tagged. In this way, only communications that are not tagged in the associative table may need to be reviewed.

20 Claims, 10 Drawing Sheets

700

| CONTENT ID (710) | COMPLIANCE ID (720) | PLATFORM POST ID (730) | LANDING PAGE (740) |
|---|---|---|---|
| 821 | 831 | SNID 520 | LINK TO PAGE |
| ⋮ | ⋮ | ⋮ | ⋮ |

FIG. 7

SYSTEM, METHOD AND COMPUTER PROGRAM PRODUCT FOR OPTIMIZATION OF POST-REVIEW PROCESS

TECHNICAL FIELD

This disclosure relates generally to review of content delivered over a network. More particularly, this disclosure relates to optimization of a post-review process, the process allowing supervisory systems of highly regulated industries to interact with social networks in a compliant manner.

BACKGROUND OF THE RELATED ART

Advances in communications technology can rapidly change how people communicate and share information. For example, social networking sites now provide users to interact and keep others abreast of their personal and business dealings in an almost instantaneous manner. The growth of social networking sites is staggering. New sites are emerging daily and new users are joining in droves. Today, social networking sites are being used regularly by millions of people around the globe, and it seems that social networking via websites will continue to be a part of everyday life at least in the United States.

Some social networking sites provide functions in the form of Web applications for members to create user profiles, send messages to other members who are their "friends," and personalize Web pages available to friends and/or the general public. Through these Web applications, social networking sites can connect people at low cost and very high efficiency. Some entrepreneurs and businesses looking to expand their contact base have recognized these benefits and are utilizing some social networking sites, perhaps in conjunction with other types of social media such as mobile apps, as a customer relationship management tool for selling their products and services. The term Social Media refers to the use of web-based and mobile technologies to turn communication into an interactive dialogue. Consistent use of engagement on social networks can be core to building a successful business through social media.

Businesses and entities alike may want to embrace social networking sites as an additional method to exchange information between employees, clients, vendors, etc. To do so, they may need to ensure that content submitted by people associated with the entity meets certain rules and regulations. For example, they may be concerned with the kind of content may be posted, the extent to which information may be disclosed, to whom is the information being disclosed, how to prevent malicious or otherwise damaging material from being accessed or otherwise affecting enterprise computers. Perhaps one of the more difficult issues is whether and how a business can manage the activities of particular enterprise users (or groups thereof) to ensure that their contents posted to social networking sites meet compliance guidelines and applicable regulations.

Currently, there does not appear to be any viable solutions to address these important issues as businesses often do not have control over what users post onto social networking sites. At one end of a spectrum, some businesses may set up their firewalls to block traffic to and from social networking sites altogether, thereby avoiding having to monitor and/or enforce compliance of their employees. At the other end of the spectrum, some businesses may not block traffic to and from social networking sites at all and can only hope that their employees are only using these social networking sites in the best interest of the company. Some businesses may set up their firewalls to selectively allow traffic to and from certain social networking sites. However, there is no guarantee that the employees may police their own access to and participation at any social networking sites, and there is always the concern of an employee knowingly or unknowingly posting confidential information on a social networking site.

Highly regulated entities such as a securities firm may take the first approach mentioned above and do not allow their employees to use social networks. Alternatively, they may allow employees to post and then archive the posted content. This includes archiving all communications and post-reviewing all archived communications. These existing solutions do not ensure compliance of their users and may put the firm at risk of fines. Because of these risks and increases in workload, many businesses simply choose to deny their employees access to social networking sites and forgo the efficiencies and cooperative gains that may come from embracing social networking sites.

SUMMARY OF THE DISCLOSURE

Embodiments disclosed herein provide a system, method and computer program product having at least one non-transitory computer readable medium storing computer instructions translatable by a machine for optimizing a post-review process for content subject to an archival review. Embodiments disclosed herein can decrease workload for post-reviewing archived content by allowing entities to identify pre-approved content in archival systems so that post-review for pre-approved content may be eliminated.

In some embodiments, users associated with an entity may submit content that has been pre-approved to social networking sites. The pre-approval process may occur prior or in response (on-the-fly) to the user request. For example, a user may create a piece of content and submit same for review and approval before posting that piece of content to an online platform such as a social networking site. A piece of content that has been reviewed and approved may be assigned or otherwise associated with a compliance identification (ID).

In embodiments disclosed herein, a piece of content may be associated with a content ID, compliance ID, one or more platform post IDs, and optionally a landing page. In one embodiment, a table may store ID information associated with the piece of content.

In one embodiment, a request submitted by a user to post to a social network is processed to ensure that the request is associated with pre-approved content. The response from the social network is processed to obtain a platform post identifier. In one embodiment, a lookup table is updated to reflect that the pre-approved content is associated with the platform post identifier. An associative table containing a set of communications with the social network may be processed to obtain platform post identifiers. Communications that have platform post identifiers associated with pre-approved content identifiers are tagged. In this way, only communications that are not tagged in the associative table may need to be reviewed.

Software implementing embodiments disclosed herein may be implemented in suitable computer-executable instructions that may reside on a computer-readable storage medium. Within this disclosure, the term "computer-readable storage medium" refers to any non-transitory data storage medium that can be read by a processor. Examples of non-transitory computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

These, and other aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 7 depicts a diagrammatic representation of an example table storing content identification information according to one embodiment disclosed herein;

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Figure 1:
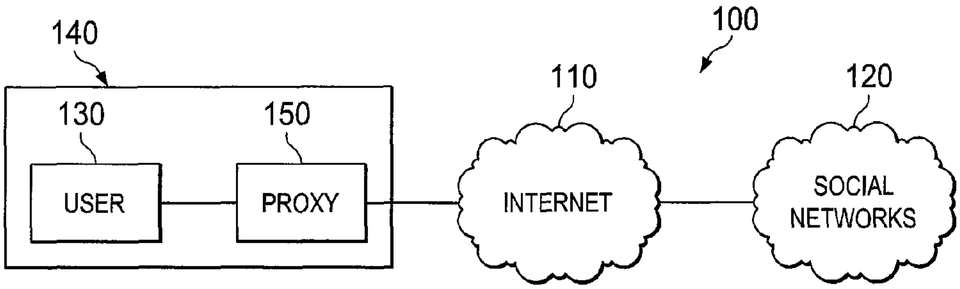
FIG. 1 (PRIOR ART)
FIG. 1 depicts a simplified diagrammatic representation of a prior art architecture for controlling network access to and from social networks.

FIG. 1 depicts a simplified diagrammatic example of how traditionally an entity or organization may monitor and control network traffic to and from social networking sites. In example system 100, Company A may own and operate company network 140. Examples of company network 140 may include a local area network (LAN), an intranet—a private computer network within the organization, etc. User 130 of company network 140 may access Internet 110 via proxy 150. Social networking sites 120 may be generally accessible by users connected to Internet 110. As an example, social networks 120 may include, but are not limited to, Facebook®, LinkedIn®, Twitter®, MySpace®, Friendster®, Multiply®, Orkut®, Cyworld®, Hi5®, and others. All trademarks, service marks, and logos used herein are properties of their respective companies.

In some cases, proxy 150 of company network 140 may monitor and block all network traffic to and from one or more social networking sites 120 by way of a firewall implemented on proxy 150. As known to those skilled in the art, a firewall may be implemented as a part of a computer system or network that is designed to block unauthorized access while permitting authorized communications. A firewall may be implemented as a device or a set of devices configured to permit, deny, encrypt, decrypt, or proxy all incoming and outing network traffic between different domains based upon a set of rules and other criteria. Firewalls may be implemented in hardware, software, or a combination of both. Firewalls are frequently used to prevent unauthorized Internet users from accessing private networks connected to the Internet, especially intranets. Generally, all messages entering or leaving the intranet pass through the firewall, which examines each message and blocks those that do not meet the specified security criteria.

Proxy 150 represents a server computer that acts as an intermediary for requests from user 130 seeking resources from other servers, including those that reside outside of network 140. Those skilled in the art can appreciate that user 130 is a representation of a typical user in company network 140 and may include software and hardware utilized by the user to access company network 140 and Internet 110.

Figure 2:
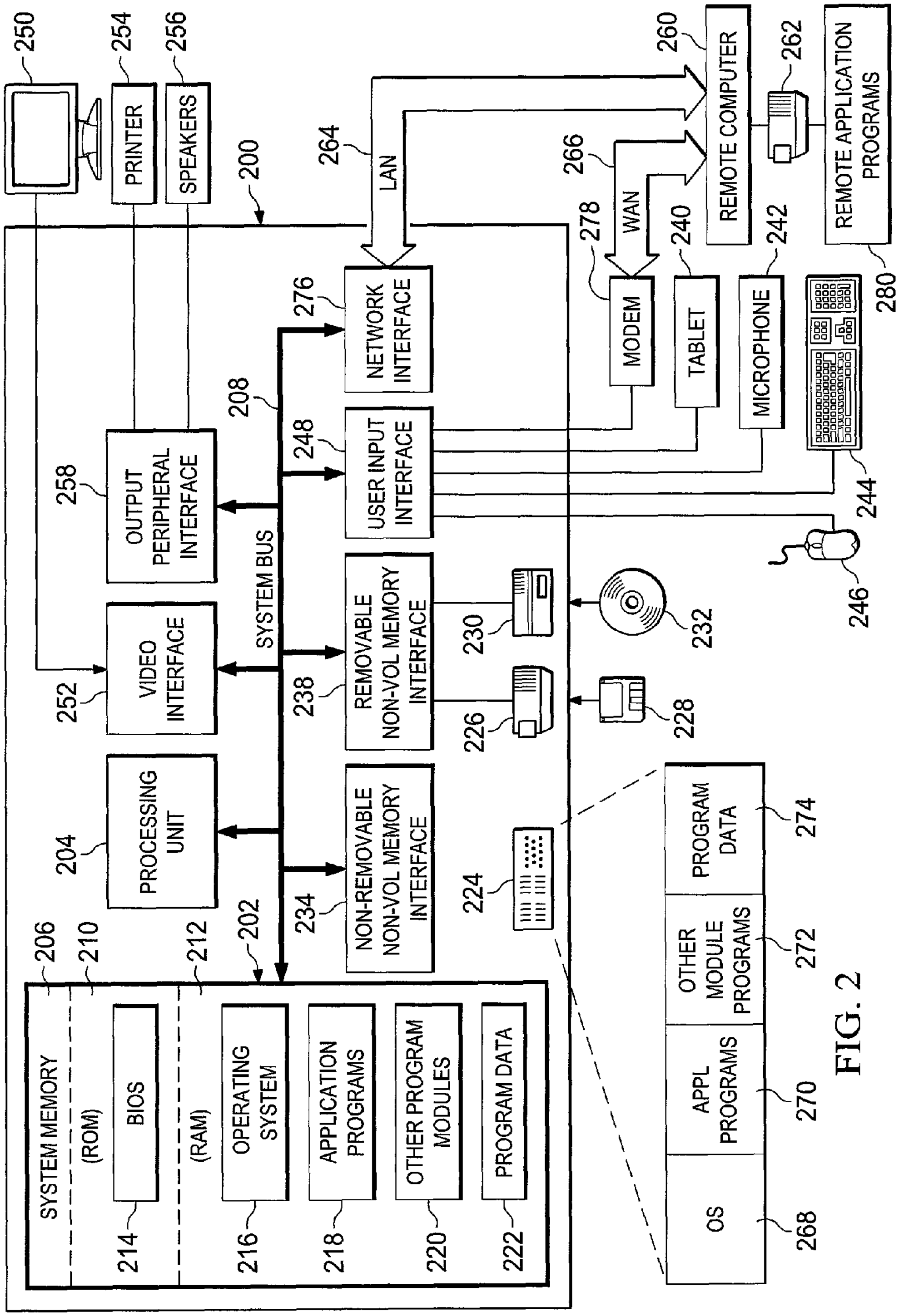
FIG. 2 depicts a diagrammatic representation of an exemplary computer system comprising at least one non-transitory computer readable medium storing instructions implementing an embodiment disclosed herein.

FIG. 2 depicts an exemplary system within a computing environment where embodiments disclosed herein may be implemented. For example, referring to FIG. 3, computing system 200 may implement proxy server computer 350 residing in company network 340. As another example, computing system 200 may be a client computer associated with user 330. As yet another example, computing system 200 may implement an embodiment of middleware 310 and be communicatively connected to proxy server computer 350. Middleware 310 can be implemented in the form of control logic in software or hardware or a combination of both.

Components 202 of computing system 200 may include, but are not limited to, processing unit 204, system memory 206, and system bus 208. System bus 208 may couple various system components including system memory 206 to processing unit 204. System bus 208 may comprise any of several types of bus structures including a memory bus or memory controller, a peripheral bus, and a local bus using any of a variety of bus architectures.

Computing system 200 may include a variety of non-transitory computer readable storage media. Computer readable storage media can be any available storage media that can be accessed by computing system 200. By way of example, and not of limitation, computer readable storage media may comprise volatile and nonvolatile storage media and removable and non-removable storage media. Computer readable storage media storing computer instructions implementing embodiments disclosed herein may be manufactured by known methods and materials and may rely on known programming languages and techniques for storage of information thereon. Examples of computer readable storage media may include, but are not limited to, random access memory (RAM), read only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 200.

In the example shown in FIG. 2, system memory 206 includes ROM 210 and RAM 212. ROM 210 may store basic input/output system 214 (BIOS), containing the basic routines that help to transfer information between elements within computing system 200, such as those used during start-up. RAM 212 may store data and/or program modules that are immediately accessible to and/or presently being operated on by processing unit 204. By way of example, and not of limitation, FIG. 2 shows RAM 212 storing operating system 216, application programs 218, other program modules 220, and program data 222.

Computing system 200 may also include other removable/non-removable, volatile/nonvolatile computer readable storage media that can be employed to store computer instructions implementing some embodiments disclosed herein. By way of example only, computing system 200 may include hard disk drive 224, a magnetic disk drive 226, and/or optical disk drive 230. Hard drive (HD) 224 may read from and write to non-removable, nonvolatile magnetic media. Disk drive 226 may read from and write to removable, nonvolatile magnetic disk 228. Optical disk drive 230 may read from and write to a removable, nonvolatile optical disk 232 such as a CD ROM or other optical medium. Other removable/non-removable, volatile/nonvolatile computer readable storage media are also possible. As illustrated in FIG. 2, hard drive 224 may be connected to system bus 208 via a non-removable memory interface, such as interface 234, and magnetic disk drive 226 and optical disk drive 230 may be connected to system bus 208 via a removable memory interface, such as interface 238.

The drives and their associated computer readable storage media, discussed above, may provide storage of computer readable instructions, data structures, program modules and other data for computing system 200. For example, hard disk drive 224 may store operating system 268, application programs 270, other program modules 272 and program data 274. Note that these components can either be the same as or different from operating system 216, application programs 218, other program modules 220, and program data 222.

A user may enter commands and information into computing system 200 via input devices such as tablet or electronic digitizer 240, microphone 242, keyboard 244, and pointing device 246. Pointing device 246 may comprise a mouse, a trackball, and/or a touch pad. These and other input devices may be connected to processing unit 204 via user input interface 248. User input interface 248 may be coupled to system bus 208 or via other interface and bus structures, such as a parallel port, a game port, or a universal serial bus (USB).

Monitor or other type of display device 250 may be connected to system bus 208 via an interface, such as a video interface 252. Monitor 250 may also be integrated with a touch-screen panel or the like. Note that the monitor and/or touch screen panel can be physically coupled to a housing in which computing system 200 is incorporated, such as in a tablet-type personal computer. Computing system 200 may comprise additional peripheral output devices such as speakers 256 and printer 254, which may be connected via an output peripheral interface 258 or the like.

Computing system 200 may operate in a networked environment and may have logical connections to one or more remote computers, such as remote computing system 260. Remote computing system 260 may be a personal computer, a server, a router, a network PC, a peer device or other common network node. Although only a memory storage device 262 is shown in FIG. 2, remote computing system 260 may include application programs 280 and many or all of the components and features described above with reference to computing system 200. Logical connections between computing system 200 and remote computing system 260 may include local area network (LAN) 264, connecting through network interface 276, and wide area network (WAN) 266, connecting via modem 278. Additional networks may also be included.

As an example, suppose computing system 200 is associated with user 330, remote computing system 260 may represent proxy server computer 350 operating in company network 340 and being communicatively connected to computing system 200 via LAN 264, or it may represent another computer on Internet 110 or a server computer hosting social networking site 320 and being communicatively connected thereto via WAN 266.

Embodiments disclosed herein can be implemented to run on various platforms operating under system software such as IBM OS/2®, Linux®, UNIX®, Microsoft Windows®, Apple Mac OSX® and others in development or commercially available. The functionality disclosed herein may be embodied directly in hardware, in a software module executed by a processor or in any combination of the two. Furthermore, software operations may be executed, in part or wholly, by one or more servers or a client's system, via hardware, software module or any combination of the two. A software module (program or executable) may reside on one or more computer readable storage media described above. In FIG. 2, an exemplary storage medium is coupled to the processor such that the processor can read information from, and write information to, the storage medium. In the alternative, the storage medium may be integral to the processor. The processor and the storage medium may also reside in an application specific integrated circuit (ASIC). The bus may be an optical or conventional bus operating pursuant to various protocols that are known to those skilled in the art.

In an illustrative embodiment, computer instructions implementing some embodiments disclosed herein may comprise lines of compiled C++, Java, or other language code. Other architectures may be used. In the hardware configuration above, various software components may reside on any single computer or on any combination of separate computers. In some embodiments, some or all of the software components may reside on the same computer. In some embodiments, the functions of any of the systems and methods may be performed by a single computer. In some embodiments, different computers than those that are shown in FIG. 2 may perform those functions. Additionally, a computer program or its software components with such code may be embodied in one or more computer readable media in one or more computers.

Figure 3:
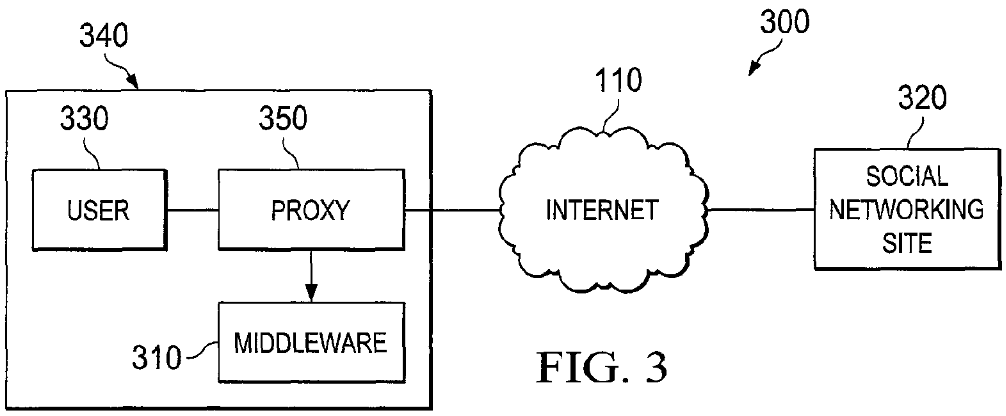
FIG. 3 depicts a diagrammatic representation of a high level network architecture in which embodiments disclosed herein may be implemented.

FIG. 3 depicts a diagrammatic representation of how an entity or organization implementing an embodiment disclosed herein may monitor and protect network traffic to and from social networking sites. In this example, Company B may own and operate social networking site 320 independent of Company A which owns and operates enterprise computing environment 340, also referred to herein as company network 340, internal network 340 or simply network 340. Company A may represent an entity. Examples of such an entity may include, but are not limited to, an enterprise, a business, a company, a school, a hospital, a library, a government agency, an office, a home, and so on. End user 330 may represent any individual in a public or private office, government, home, or school setting and may include software and hardware necessary for accessing network 340 and Internet 110. End user 330 may utilize a computing device to bi-directionally connect to Internet 110 where social networking site 320 resides. Communications media that may facilitate such bi-directional connections may include an intranet, a virtual private network ("VPN"), and/or a wireless network, etc.

Company B may comprise hardware, software, infrastructure, and people necessary to operate and maintain social networking site 320. Social networking site 320 may be implemented in a manner known to those skilled in the art. As a specific example, a user may log in to social networking site 320 via a browser application or via a mobile application running on the user's wired or wireless computing device. Examples of a wireless computing device may include, but are not limited to, a laptop computer, a personal digital assistant (PDA), a mobile phone, an Internet enabled mobile device, and so on.

Figure 4:
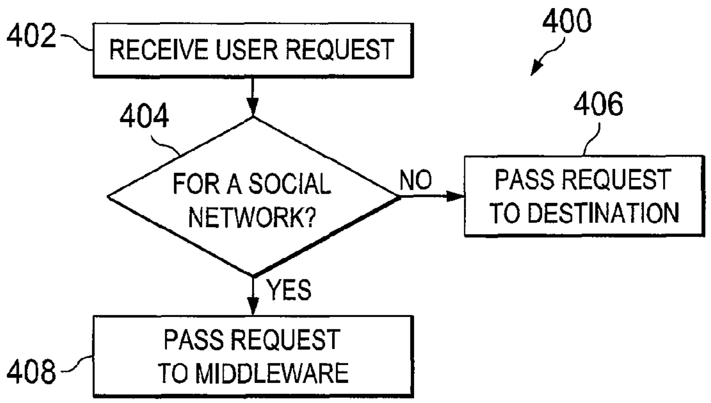
FIG. 4 depicts a flow diagram illustrating an example method of intercepting communications between an enterprise user and a social networking site.

In the example of FIG. 3, proxy server 350 resides within network 340 and is bi-directionally coupled to end user 330 via a wired or wireless internal network connection. Proxy server 350 may be communicatively coupled to social network 320 over Internet 110. Proxy server 350 can be implemented in the form of control logic in software or hardware or a combination of both. In some embodiments, proxy server 350 may function as a gateway or intermediary between end user 330 and social networking site 320. More specifically, proxy server 350 may be responsible for receiving all incoming requests from and sending corresponding responses to end user 330. As illustrated in FIG. 4, in some embodiments of flow 400, proxy server 350 may operate to receive a user request from user 330 (step 402), determine whether that request contains a destination pertaining to a social networking site (step 404), and either pass the request from user 330 that is destined to a social networking site to middleware 310 for processing (step 408) or pass the request to the destination (step 406) if it is not destined to a social networking site.

In some embodiments, middleware 310 may reside within network 340. Specifically, in one embodiment, middleware 310 may be implemented on a server computer in network 340. One example of such a server computer may be an embodiment of computing system 200 described above. In some embodiments, middleware 310 may be implemented as a service to proxy 350 or network 340. In some embodiments, middleware 310 may be implemented as part of proxy 350. One example of proxy 350 may be an embodiment of computing system 200 described above. Some embodiments of middleware 310 may be implemented without proxy 350. For example, middleware 310 may reside on a server computer that operates outside of network 340. When user 330 sends, via a browser application running on a computing device of user 330, a request for a page from social networking site 320, the domain name server (DNS) may redirect the user request to middleware 310. Middleware 310 may process the user request, obtain the requested application data from social networking site 320, process the application data received from social networking site 320, prepare the requested page, and return it to user 330.

Figure 5:
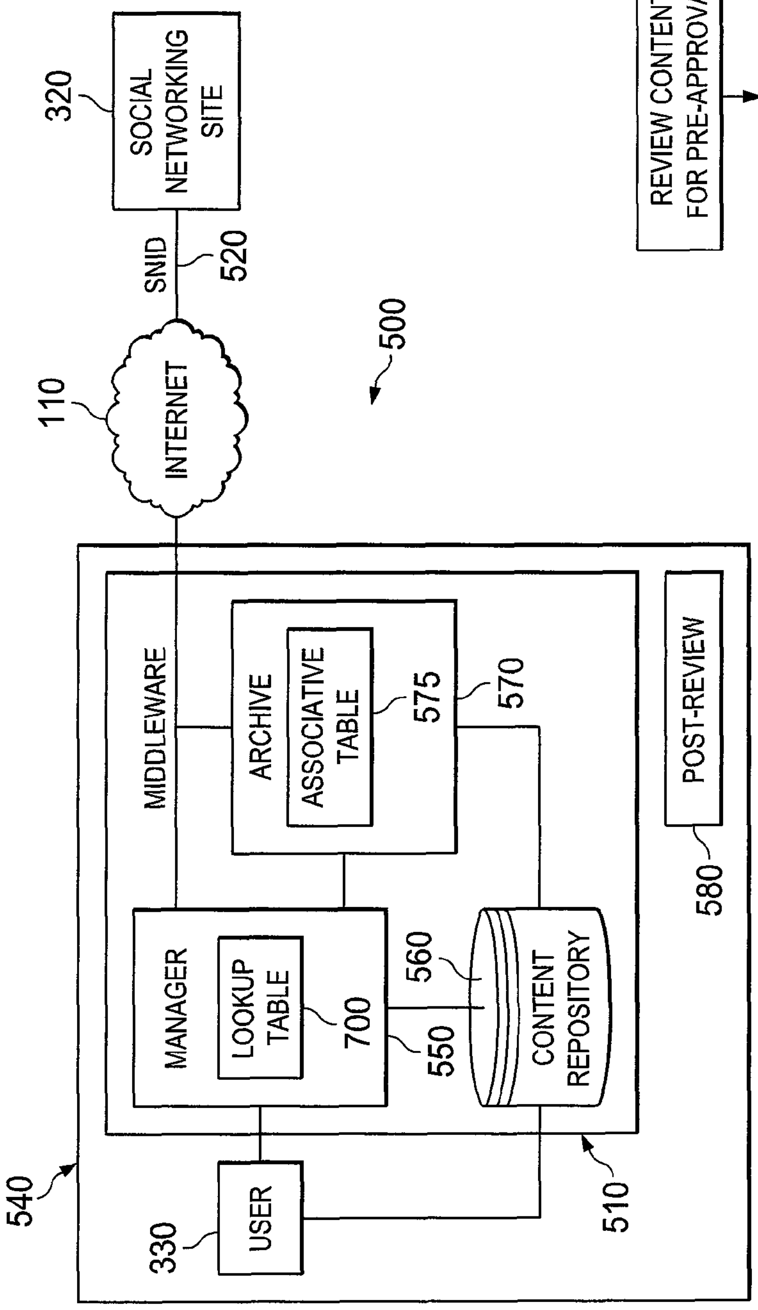
FIG. 5 depicts a diagrammatic representation of a system architecture in which embodiments disclosed herein may be implemented.

FIG. 5 depicts a diagrammatic representation of system 500 in which embodiments disclosed herein may be implemented. In one embodiment, system 500 may comprise computing environment 540 which may be owned and operated by an entity in a highly regulated industry in which all static contents intended to be distributed to the general public must be pre-approved and archived. In one embodiment, all interactive communications between network 540 and the general public and third parties must be archived and post-reviewed for compliance. In this disclosure, computing environment may be referred to interchangeably as entity 540, private network 540, internal network 540 or simply network 540. Network 540 may be an embodiment of network 340 described above. Components of system 500 will be further described below in conjunction with FIG. 6.

Figure 6:
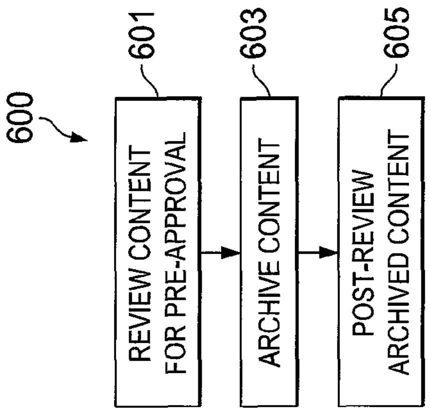
FIG. 6 depicts a diagrammatic representation of an example review process in accordance to one embodiment disclosed herein.

FIG. 6 depicts a diagrammatic representation of example review process 600 in accordance to one embodiment disclosed herein. As an example, a securities firm may have financial supervisory teams to pre-review any static content to be posted to a website or distributed (e.g., via email) to more than a predetermined number (e.g., 25) of users (step 601), archive all external communications (step 603), and post-review all archived corporate email and instant messaging conversations (step 605) for regulatory reasons. With the emergence of social media, regulatory firms such as Financial Industry Regulatory Authority (FINRA) have set guidelines on how social media communications should be reviewed and archived as well.

To illustrate the scope of this review process, suppose a press release about a new product is created and submitted to supervisory teams in network 540 for pre-approval. If the press release is pre-approved, it is assigned a content ID and stored in pre-approved content database or repository 560. Each pre-approved piece of content may be associated with a compliance ID, which may be associated with a piece of regulation. The pre-approved press release may be posted by 5 users in network 540 to, say, 10 different social networking accounts (which may or may not be with the same social networking sites). Additionally, the same or different users in network 540 may send the pre-approved press release to 100 people external to network 540. All posts and interactions are captured and archived. Supervisory teams in network 540 must then perform post-reviewing of all the archived posts and interactions, which amounts to 10 posts and 100 email interactions in this example, even though they all relate back to the same, pre-approved piece of content—the press release.

The above-described example involves a single piece of content. It can be very time consuming, expensive, and labor intensive to have to review all the archived posts and interactions for all the content items shared by all the users in network 540.

Embodiments disclosed herein can significantly reduce the amount of load on compliance that the use of social media could cause. According to one aspect, this is achieved by bridging two different processes—content sharing and system archiving. The former is triggered by a user action and the latter can be programmed to be automatically performed by a server computer. These two processes may be handled primarily by two software components (which, in one embodiment, may be implemented as two computer program products)—a content publication management system and a content archiving system. With the content publication management system, which, in one embodiment, may be referred to as Voices, users can choose to share a piece of pre-approved content out as communication on social networks. The content archiving system captures all user communications on each social network. Each communication that is found to be a post of pre-approved content found in the content archiving system is tagged with a pre-approval identifier which also links the post back to the original pre-approved content. This tag allows supervisory teams to easily identify when a post has already been pre-approved so they do not have to re-review it, and also allows them to easily search for all users who have posted the given pre-approved content and what social networks they have posted the pre-approved content to.

Referring to FIG. 5, user 330 may be communicatively connected to social networking site 320 via Internet 110 and middleware 510. As described above with reference to middleware 310, middleware 510 may be implemented in various ways and can be internal or external to a proxy server which, for the sake of clarity, is not explicitly drawn in FIG. 5. In this example, user 330 may have access to content repository 560 which stores pre-approved static contents that have been reviewed for regulation compliant purpose(s) and approved for distribution to the general public (e.g., via social networking site 320).

In one embodiment, each piece of content (also referred to as a content item) stored in content repository 560 may have a content identification (content ID) associated therewith. A pre-approved content item may be associated with a compliance identification (compliance ID). While content ID identifies a piece of pre-approved content, the compliance ID associated with the piece of content may indicate that the particular piece of content conforms to certain rules and regulations.

The compliance ID and content ID may reside in lookup table 700 accessible by Manager 550. Table 700 may also contain other pieces of information associated with a content item. For example, referring to FIG. 7, table 700 may contain fields such as content ID field 710, compliance ID field 720, platform post ID field 730 and, optionally, landing page field 740. In the example of FIG. 7, platform post ID field 730 may contain a platform post identifier (e.g., SNID 520) which may be obtained from a response to a request to post on social networking site 320. This process will be explained in detail below with reference to FIG. 12. Landing page field 740 may contain a network address (e.g., Universal Resource Locator) to a landing page associated with user 330. An example landing page is described below with reference to FIG. 10. Other fields may also be included. Each row of data may be associated with a piece of content.

User 330 may wish to share content from content repository 560 (either created by user 330 or other user(s) in network 540) via social networking site 320. Middleware 510 can tag this communication as being pre-reviewed so that it can be identified during a post-review process. This allows supervisory teams performing the post-review to avoid having to re-review it again.

In one embodiment, this tagging is made possible by enabling two middleware components—a content publication management system and a content archiving system—to collaborate with each other. The content publication management system may comprise Manager 550, an example of which is shown in FIG. 5. As will be explained later, Manager 550 may allow users in network 540 to publish pre-approved content (e.g., media assets such as video clips, images, files, etc.), distribute the pre-approved content to various outlets, including social networking site 320, share the pre-approved content across platforms, track and analyze the results for further optimization and expansion, and even engage other users, including those outside of network 540.

In one embodiment, the content archiving system may comprise Archive 570. Archive 570 may collect information on network traffic in one or more associative tables. In one embodiment, Archive 570 may capture communications between users in network 540 and social networking site 320 in associative table 575. In one embodiment, Archive 570 may include instructions translatable by a machine to utilize information in table 700 to identify pre-approved content and update associative table 575 accordingly. This process is further described below with reference to FIG. 13. The optimized associative table 575 may be reviewed via post-review process 580.

In one embodiment, archive 570 may copy the associative tables to one or more persistent data storage media for preservation. Examples of suitable persistent data storage media may include hard disks, tapes, etc.

Figure 8:
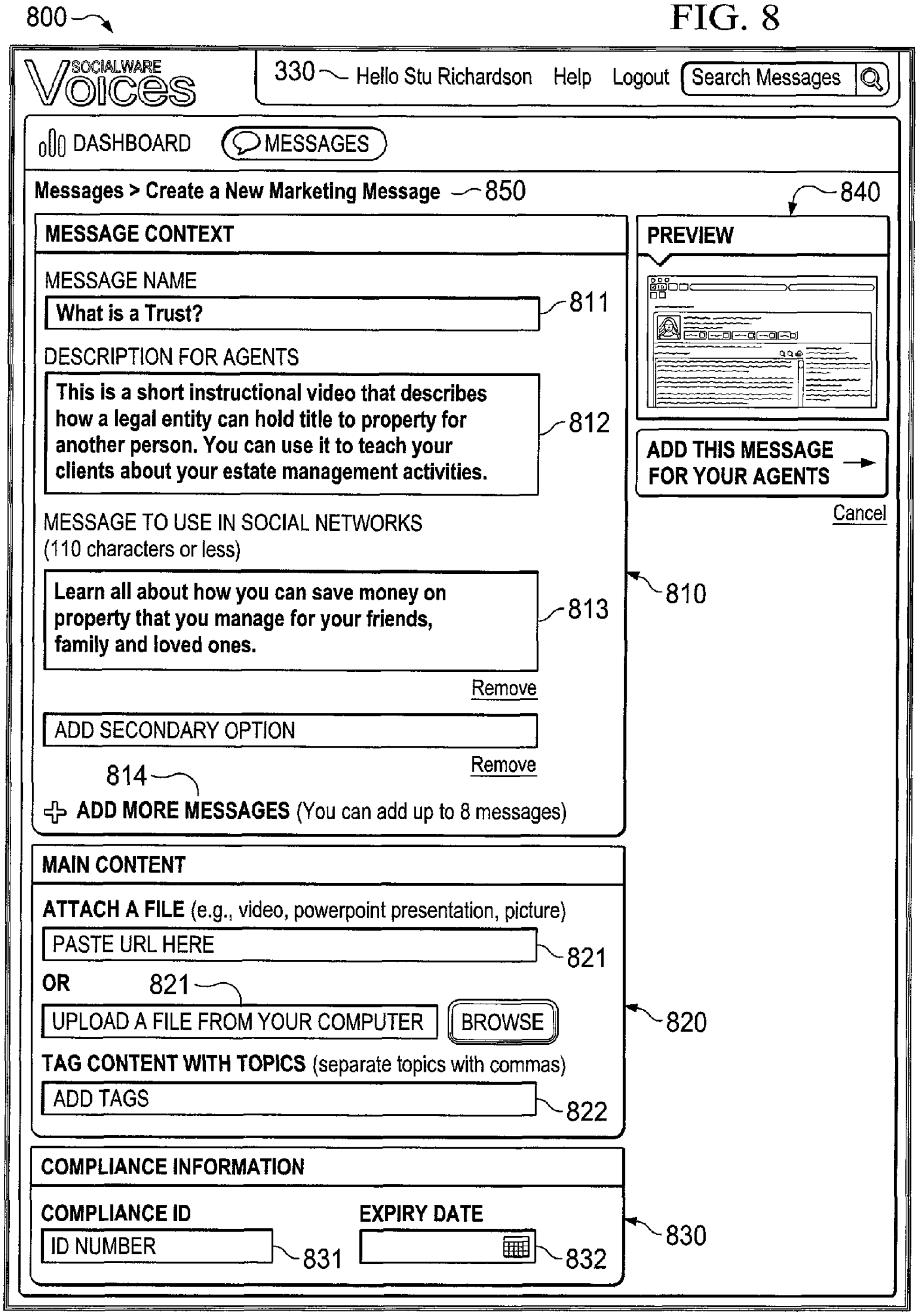
FIG. 8 depicts a diagrammatic representation of an example user interface of a content publication management system which allows an enterprise user to create a new message and attach a piece of pre-approved content thereto.

FIG. 8 depicts a diagrammatic representation of example user interface 800 of Manager 550. Through dashboard 800, user 330 can create new marketing message 850 to be uploaded to Social Networking Site 320. For example, user 330 may specify message context 810 for new marketing message 850. User 330 may create message name in box 811. A description of the message may be added in box 812 for agents of entity 340. Examples agents may include sales representatives, financial advisers, marketing personnel, etc. User 330 may also have the option of adding a specific message to use for new marketing message 850 in Social Networking site 320. User 330 may also add more messages by clicking on link 814.

As illustrated in FIG. 8, user 330 may choose specific content in main content area 820. For example, user 330 may attach pre-approved content by providing a Universal Resource Locator address (URL) where the pre-approved content resides in content repository 506 or uploading a file from user 330's computer. Assuming, for now, user 330 provides an URL to a piece of pre-approved content in box 821. User 330 may provide in box 822 keywords that briefly describe topic(s) to which the selected content item might be relevant. These keywords can allow the associated content to be found again whenever a user is browsing or searching relevant topics identified in box 822.

In one embodiment, dashboard 800 may allow user 330 to add in box 831 compliance information associated with the pre-approved content referenced by the URL in box 821. As an example, the pre-approved content referenced by the URL in box 821 may be associated with compliance ID indicated in box 831, as shown in lookup table 700 of FIG. 7. An expiration date associated with the compliance ID indicated in box 831 may be entered in box 832. Prior to posting to Social Networking Site 320, user 330 may preview new marketing message 850 via preview section 840.

Figure 9:
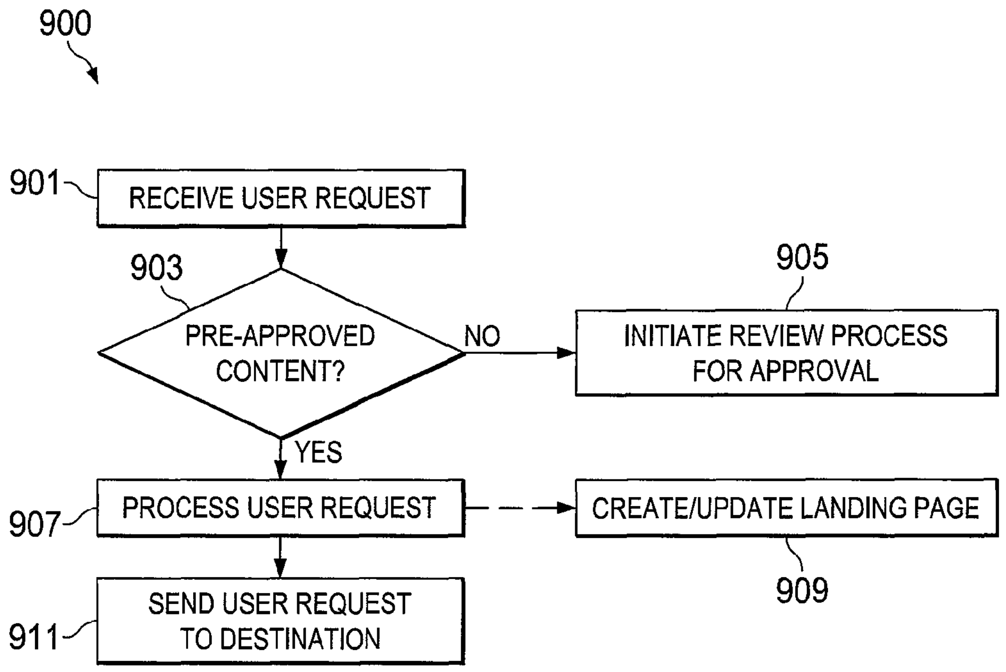
FIG. 9 depicts a diagrammatic representation of an example method of processing a request to post content to a social networking site.

FIG. 9 depicts a diagrammatic representation of an example method of processing a request to post content to a social networking site. As an example, user 330 may submit a request to post new marketing message 850 (step 901). At step 903, the request may be examined to determine whether a content item referenced in the request has been pre-approved. One way to determine whether the content item referenced in the request has been pre-approved may include parsing the request to search for a content ID and/or a compliance ID. Suppose a compliance ID is found, in one embodiment, method 200 may further comprise determining whether the compliance ID has expired. For example, method 200 may comprise comparing an expiration date associated with the compliance ID with the request date.

If the content referenced in the request has not been pre-approved, method 200 may take necessary action to obtain approval for the referenced content, including dynamically initiating a review process or forwarding the content referenced in the request for pre-approval (step 905). This can be useful in cases where a user desires to post a newly created piece of content, which has not yet been pre-approved, to a social networking site. The newly created content may reside at the user's computer and can be referenced in the user's request through Manager 550, via box 821 of FIG. 8, for example.

In one embodiment, approval of the piece of content may be done in real time, allowing user 330 to immediately post the piece of content. In one embodiment, user 330 may be notified of this approval review. In another embodiment, user 330 may be notified that the piece of content must be submitted for approval before it is allowed to be posted on a social networking site and that approval may take a certain amount of time. In one embodiment, user 330 may be notified that the content requested to be posted was not approved (e.g., by supervisory teams or compliance officers) and therefore may not be posted. If the content requested to be posted was not approved, the user request is rejected.

Once a piece of content has been approved by compliance officers of entity 540, the piece of content may be assigned a content ID and where applicable, a compliance ID. Content that is associated with a compliance ID and content ID may then be allowed to upload to a social networking site.

If the content referenced in the request has been pre-approved, method 200 may proceed to process the user request (step 907). In one embodiment, method 200 may further comprise an optional step of creating or updating a landing page for user 330 (step 909).

Figure 10:
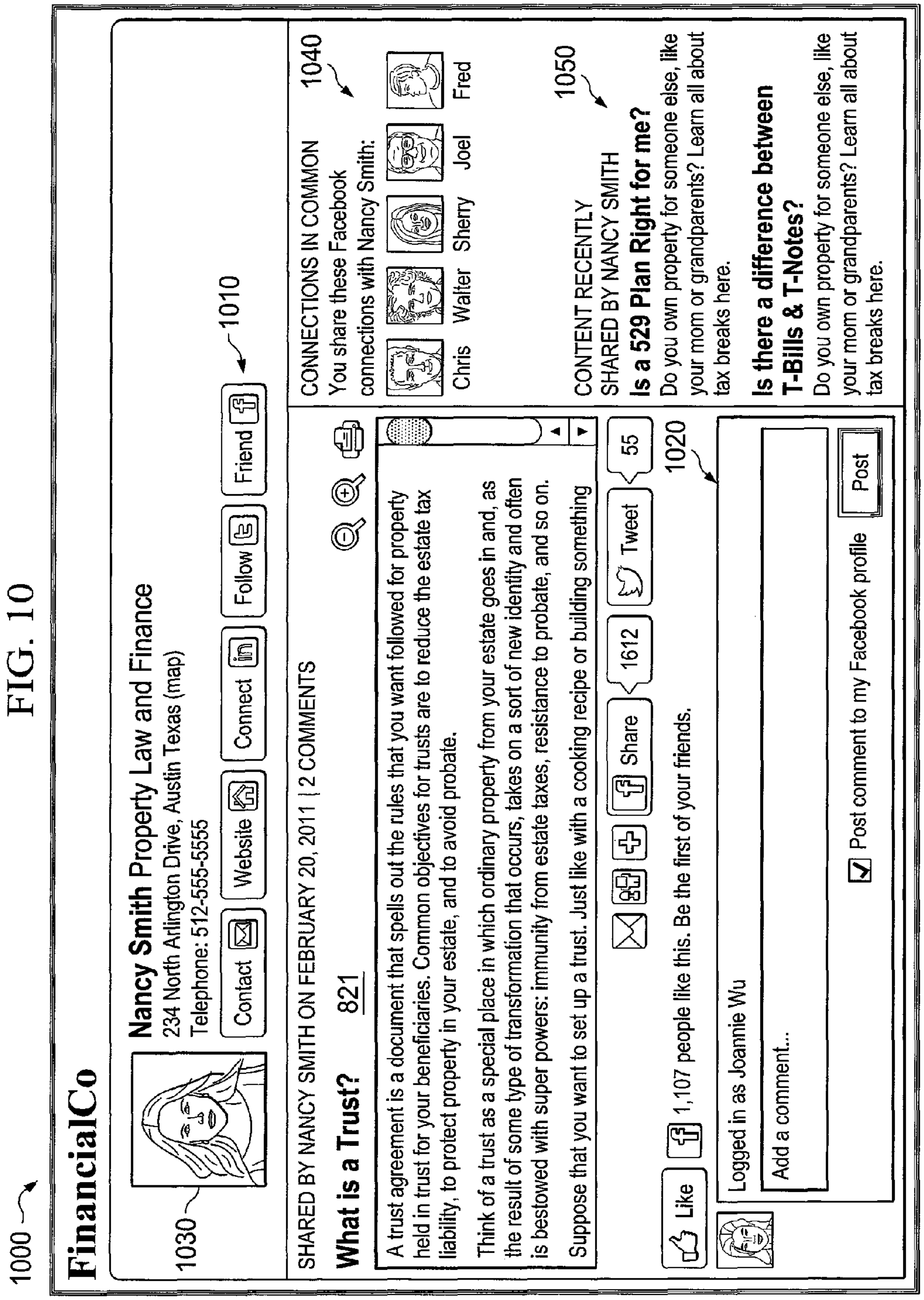
FIG. 10 depicts a diagrammatic representation of an example landing page according to one embodiment disclosed herein.

FIG. 10 depicts a diagrammatic representation of example landing page 1000 according to one embodiment disclosed herein. In one embodiment, each user in network 540 is provided with their own personal landing page. If a new user does not have a landing page, the first time that user attempts to share a content item through Manager 550, a new landing page is created for that user. Each time content is shared, a new additional landing page (shown in FIG. 10) is created with that content. The personal landing page is then updated to have a link to the new content that is created. In this way, landing pages allow Manager 550 to track many content and engagement metrics and allow users of network 540 to personalize how content is shared. In one embodiment, personalization can be made through a set up page provided by Manager 550.

Figure 11:
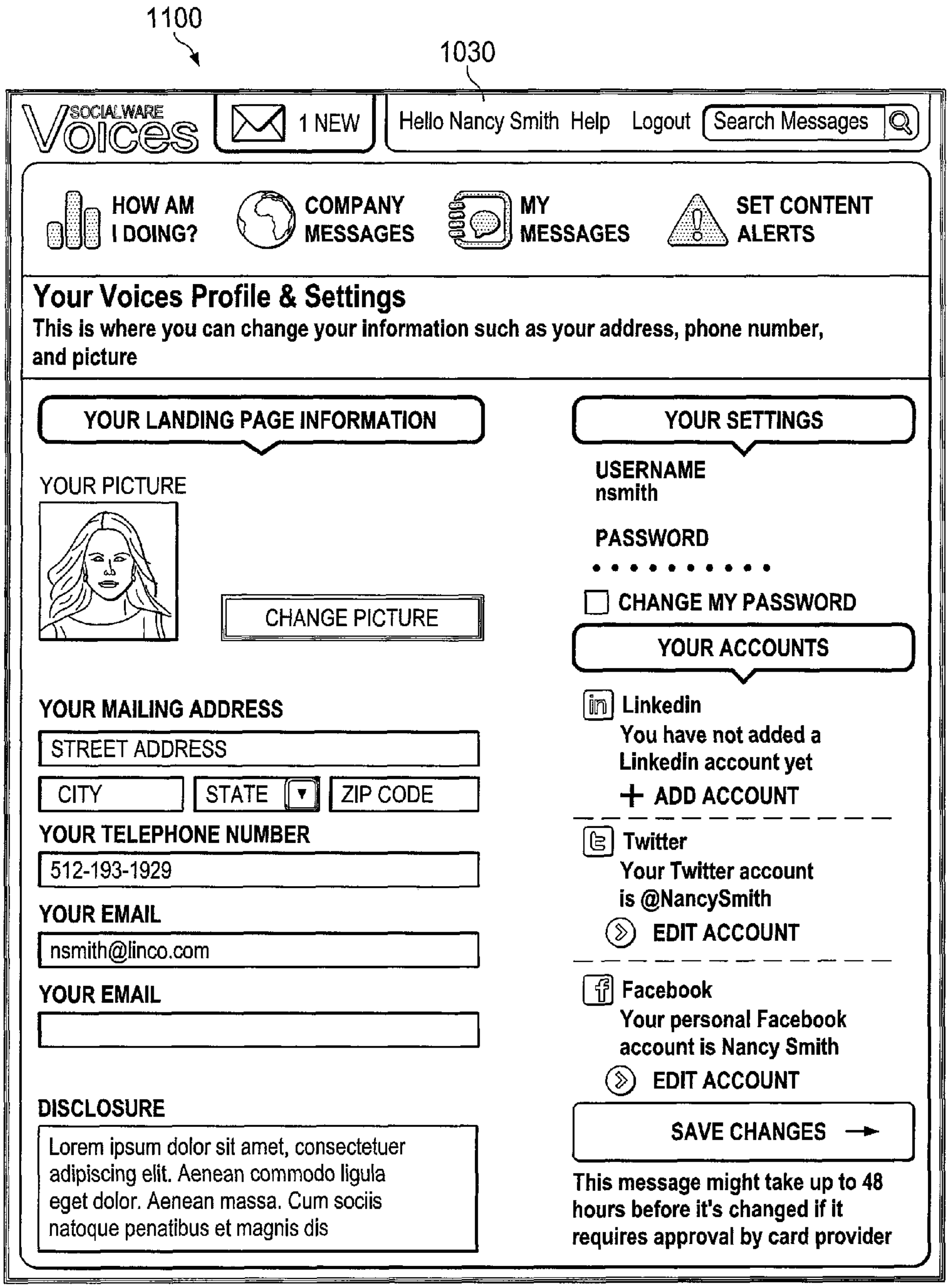
FIG. 11 depicts a diagrammatic representation of an example user interface of a content publication management system which allows an enterprise user to manage his or her landing page.

FIG. 11 depicts a diagrammatic representation of an example user interface 1100 of Manager 550 which allows user 1030 to manage and personalize her landing page 1000. For example, user 1030 may provide contact information 1010 and social networks account information through set up page 1100. Each time user 1030 posts, for instance, a pre-approved marketing message, to any of these accounts, a link to that content is added to landing page 1000. As shown in FIG. 10, visitors of landing page 1000 can choose to view the newly posted pre-approved content (which was referenced in box 821 of FIG. 8) or other contents shared by user 1030 (which are referenced by links 1050). When a visitor visits landing page 1000 of user 1030, a version of landing page 1000 is prepared in real time to show connections 1040 common between the visitor and user 1030. The visitor can directly engage user 1030 by leaving a comment in box 1020.

Referring to FIG. 9, in processing the user request to post marketing message 850 at step 907, method 900 may modify the user request to trigger a response from social networking site 320. In one embodiment, method 900 may replace a content URL in the request (the URL indicating the location of the pre-approved content in content repository 560) with a landing page URL (the URL indicating the location of the landing page) associated with the requesting user. FIG. 7 shows that lookup table 700 may optionally store the landing page URL in landing page column 740. As described above, a new landing page is created displaying the newly shared content. At step 911, the user request is forwarded to social networking site 320. The landing page notwithstanding, the actual pre-approved content is not uploaded to social networking site 320. Rather, the user request contains a reference (e.g., the content URL or the landing page URL) to the pre-approved content. In one embodiment, other than this reference, the user request may not contain any identification associated with the pre-approved content.

Figure 12:
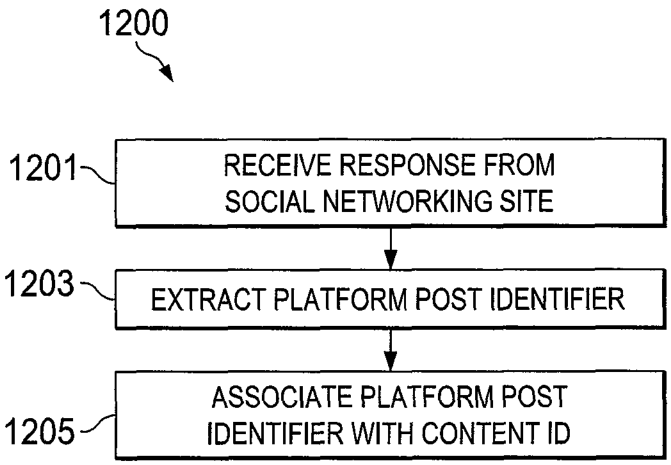
FIG. 12 depicts a diagrammatic representation of an example method of processing a response from a social networking site, according to one embodiment disclosed herein.

FIG. 12 depicts a diagrammatic representation of an example method of processing a response from a social networking site, according to one embodiment disclosed herein. As described above, the user request to post marketing message 850 contains a reference to a network location within network 540. Thus, in response to this user request, social networking site 320 may access the referenced network location in network 540. At step 1201, method 1200 may receive the response from social networking site 320. The response from social networking site 320 may contain an identifier, also referred to herein as a platform post ID, uniquely identifying this communication which is between social networking site 320 and user 330 and which is associated with the pre-approved content referenced in box 821 of FIG. 8. At step 1203, the response from social networking site 320 may be parsed to extract or otherwise obtain platform post ID. At step 1205, system 500 implementing method 1200 can associate at least two pieces of information—an URL (to the actual pre-approved content or to the landing page referencing the pre-approved content) and a platform post ID (e.g., SNID 520).

In one embodiment, system 500 implementing method 1200 may utilize lookup table 700 to associate the URL (and hence the pre-approved content referenced in box 821) with SNID 520, for example, by storing SNID 520 under the content ID corresponding to the URL. Since the pre-approved content may be posted to multiple platforms, it may be associated with multiple platform post IDs.

Figure 13:
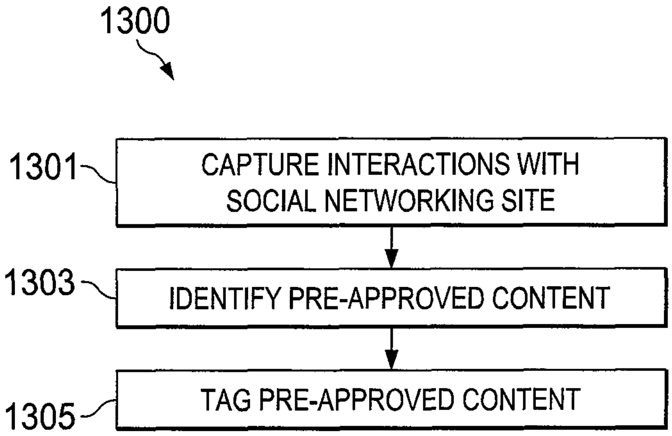
FIG. 13 depicts a diagrammatic representation of an example method of processing archived content, in accordance with one embodiment disclosed herein.

FIG. 13 depicts a diagrammatic representation of an example method of processing archived content, in accordance with one embodiment disclosed herein. As discuss above, system 500 may archive all communications between users in network 540 and the general public and third parties, including social networking site 320. This archiving process may be performed on a per platform basis. For example, at step 1301, system 500 implementing method 1300 may capture all communications between users in network 540 and social networking site 320 in associative table 575. Each communication captured in associative table 575 is associated with a unique platform post ID. At step 1303, system 500 implementing method 1300 may utilize lookup table 700 to determine, for every platform post ID in associative table 575, whether the platform post ID is associated with a content ID. If so, at step 1305, the corresponding communication is tagged as being pre-reviewed.

With the above-described process, only communications that are found to be associated with content IDs are tagged. Associative table 575 may be presented to post review 580 with tagged and untagged communications. Supervisory teams may choose to review only untagged communications.

Embodiments disclosed herein can provide many advantages including scalability as a single piece of content may be posted by multiple users in an entity. For example, a piece of content may be posted by several users in a securities firm a multitude of times. Large entities may have thousands of users who may post the same piece of content to various social networking sites. This creates a tremendous amount of records within an archive system for each piece of content that must be post-reviewed. The optimization methodology disclosed herein can eliminate the need to have to post-review the same piece of content, which has been pre-approved, regardless how many times it has been posted by multiple users on various social networking sites, thereby significantly reducing the cost, time, and resources associated with having to re-review pre-approved contents.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A method, comprising:

at a server computer having a processor and a memory storing instructions executable by the processor, obtaining, by the server computer, a platform post identifier from a response received from a social networking site over a network, the response being responsive to a user request processed at the server computer, the user request containing a reference to a piece of content;

associating the platform post identifier with the piece of content, the piece of content having been pre-approved for posting to the social networking site;

identifying a communication associated with the platform post identifier, the communication being one of a plurality of communications captured in an associative table; and tagging the communication associated with the platform post identifier as being pre-reviewed.

2. The method of claim 1, wherein processing the user request comprises determining whether the piece of content has been approved for posting to the social networking site.

3. The method of claim 2, wherein processing the user request comprises dynamically submitting the piece of content to a pre-approval process.

4. The method of claim 1, wherein the reference to the piece of content comprises a universal resource locator indicating a network location where the piece of content resides.

5. The method of claim 1, wherein the reference to the piece of content comprises a universal resource locator indicating a landing page containing a link to the piece of content.

6. The method of claim 5, wherein processing the user request comprises creating or updating the landing page.

7. The method of claim 1, wherein associating the platform post identifier with the piece of content comprises storing the platform post identifier in a lookup table under a content identifier associated with the piece of content.

8. A computer program product comprising at least one non-transitory computer readable medium storing instructions translatable by a server computer to perform:

obtaining a platform post identifier from a response received from a social networking site over a network, the response being responsive to a user request processed at the server computer, the user request containing a reference to a piece of content;

associating the platform post identifier with the piece of content, the piece of content having been pre-approved for posting to the social networking site;

identifying a communication associated with the platform post identifier, the communication being one of a plurality of communications captured in an associative table; and tagging the communication associated with the platform post identifier as being pre-reviewed.

9. The computer program product of claim 8, wherein processing the user request comprises determining whether the piece of content has been approved for posting to the social networking site.

10. The computer program product of claim 8, wherein processing the user request comprises dynamically submitting the piece of content to a pre-approval process.

11. The computer program product of claim 8, wherein the reference to the piece of content comprises a universal resource locator indicating a network location where the piece of content resides.

12. The computer program product of claim 8, wherein the reference to the piece of content comprises a universal resource locator indicating a landing page containing a link to the piece of content.

13. The computer program product of claim 12, wherein processing the user request comprises creating or updating the landing page.

14. The computer program product of claim 8, wherein associating the platform post identifier with the piece of content comprises storing the platform post identifier in a lookup table under a content identifier associated with the piece of content.

15. A system, comprising:

a server computer communicatively connected to users in a first network, the server computer having a processor and a memory storing instructions executable by the processor to perform:

obtaining a platform post identifier from a response received from a social networking site external to the first network, the response being responsive to a user request processed at the server computer, the user request containing a reference to a piece of content;

associating the platform post identifier with the piece of content, the piece of content having been pre-approved for posting to the social networking site;

identifying a communication associated with the platform post identifier, the communication being one of a plurality of communications captured in an associative table; and tagging the communication associated with the platform post identifier as being pre-reviewed.

16. The system of claim 15, wherein processing the user request comprises determining whether the piece of content has been approved for posting to the social networking site.

17. The system of claim 15, wherein processing the user request comprises dynamically submitting the piece of content to a pre-approval process.

18. The system of claim 15, wherein the reference to the piece of content comprises a universal resource locator indicating a network location where the piece of content resides.

19. The system of claim 15, wherein the reference to the piece of content comprises a universal resource locator indicating a landing page containing a link to the piece of content.

20. The system of claim 15, wherein associating the platform post identifier with the piece of content comprises storing the platform post identifier in a lookup table under a content identifier associated with the piece of content.

* * * * *